United States Patent [19]

Demarest

[11] Patent Number: 4,938,144
[45] Date of Patent: Jul. 3, 1990

[54] MOTION ACTIVATED THERMAL FOGGER

[75] Inventor: Scott W. Demarest, Racine, Wis.

[73] Assignee: S. C. Johnson & Son, Inc., Racine, Wis.

[21] Appl. No.: 155,949

[22] Filed: Feb. 16, 1988

[51] Int. Cl.⁵ .......................................... A01M 13/00
[52] U.S. Cl. ................................. 102/334; 102/204; 102/275.11; 422/305; 43/125
[58] Field of Search ........... 102/334, 204, 487, 275.11; 422/305; 116/214; 43/125, 127, 128

[56] References Cited

U.S. PATENT DOCUMENTS

| Re. 16,495 | 12/1926 | Bradner | 424/40 |
|---|---|---|---|
| Re. 16,841 | 1/1928 | Bradner | 43/129 |
| 1,309,418 | 7/1919 | Nakamizo | 126/43 |
| 1,815,226 | 7/1931 | Anderson | 116/214 |
| 2,071,171 | 2/1937 | McConnell | 43/127 |
| 2,261,467 | 11/1941 | Hanson | 44/506 |
| 2,449,695 | 9/1948 | Galloway | 422/305 |
| 2,546,964 | 4/1951 | Blackford et al. | 422/305 |
| 2,581,131 | 1/1952 | Naranick | 126/262 |
| 2,603,607 | 7/1952 | Stevenson | 47/2 |
| 2,633,455 | 3/1953 | Finkelstein et al. | 47/2 |
| 2,643,650 | 6/1953 | Miron | 426/113 |
| 2,695,258 | 11/1954 | Johnstone et al. | 43/127 |
| 2,700,011 | 1/1955 | Taylor | 424/40 |
| 2,730,482 | 1/1956 | Stevenson | 43/129 |
| 3,167,050 | 1/1965 | Johnson | 116/214 |
| 3,508,853 | 4/1970 | Thurston et al. | 431/270 |
| 3,759,216 | 9/1973 | Sanderg et al. | 102/334 |
| 3,908,550 | 9/1975 | Beatty et al. | 102/334 |
| 3,910,190 | 10/1975 | Dare | 102/275.11 |
| 3,911,823 | 10/1975 | Murray et al. | 102/275.11 |
| 3,956,849 | 5/1970 | Radulescu | 43/127 |
| 4,013,061 | 3/1977 | Trumble et al. | 102/334 |
| 4,202,269 | 5/1980 | Messineo et al. | 102/204 |
| 4,324,763 | 4/1982 | Jarman | 422/116 |
| 4,392,432 | 7/1983 | Fenrick et al. | 102/334 |
| 4,506,654 | 3/1985 | Zellweger et al. | 126/262 |

FOREIGN PATENT DOCUMENTS

| 1294861 | 5/1969 | Fed. Rep. of Germany | 116/214 |
|---|---|---|---|
| 479850 | 11/1969 | Switzerland | 102/487 |

Primary Examiner—Deborah L. Kyle
Assistant Examiner—Michael J. Carone

[57] ABSTRACT

An ignition system for a combustible insecticide forming a fumigation device. The ignition system utilizes relative motion to actuate an ignitor which, in turn, ignites the insecticide. In one aspect, the relative motion is used to load a spring which, when released, strikes the ignitor to actuate it.

7 Claims, 5 Drawing Sheets

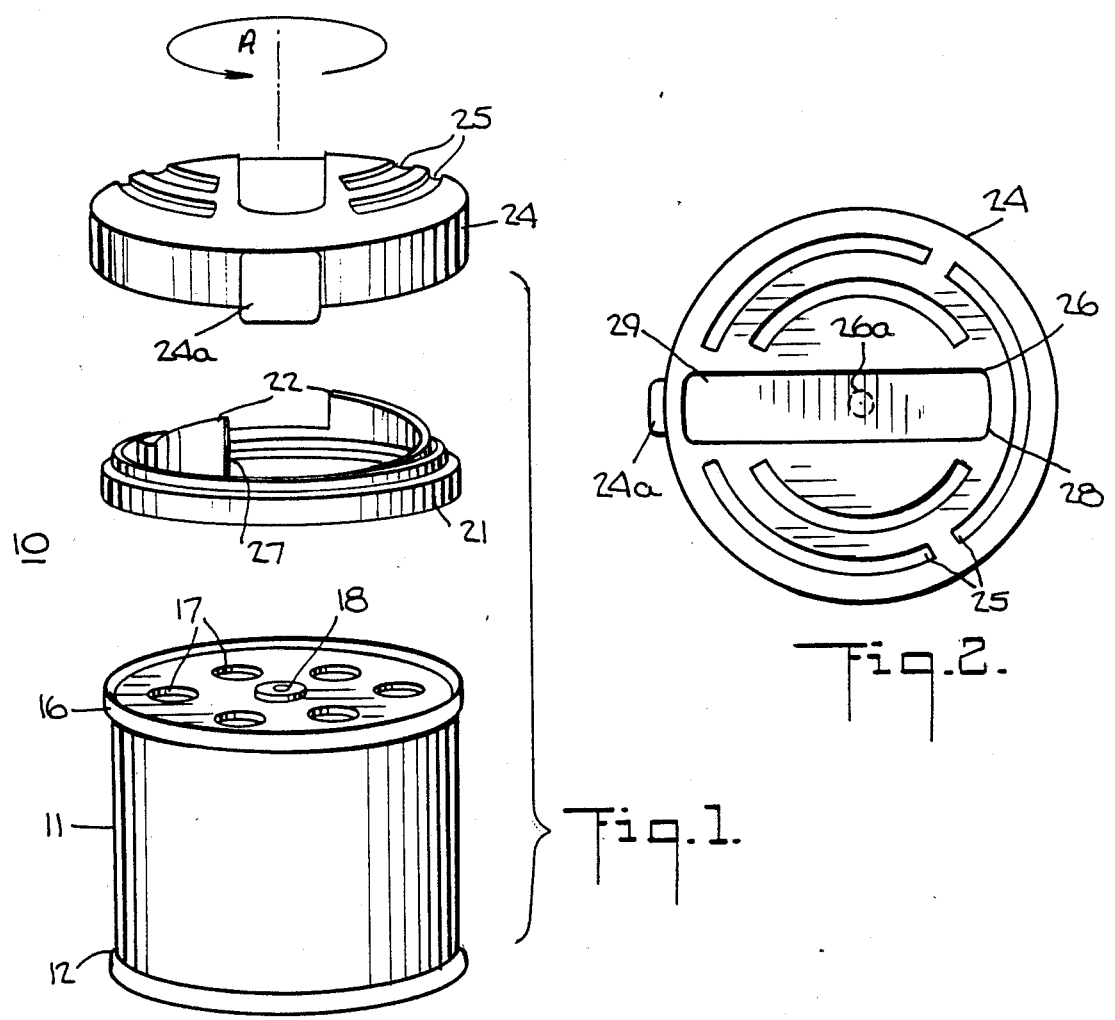
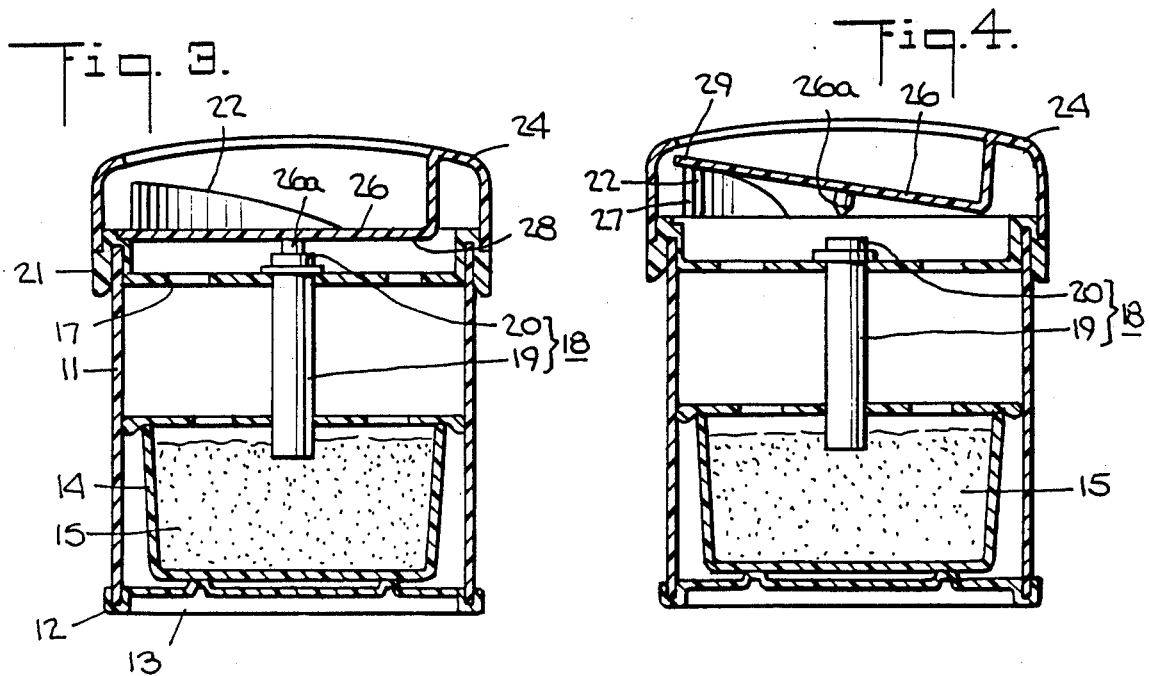

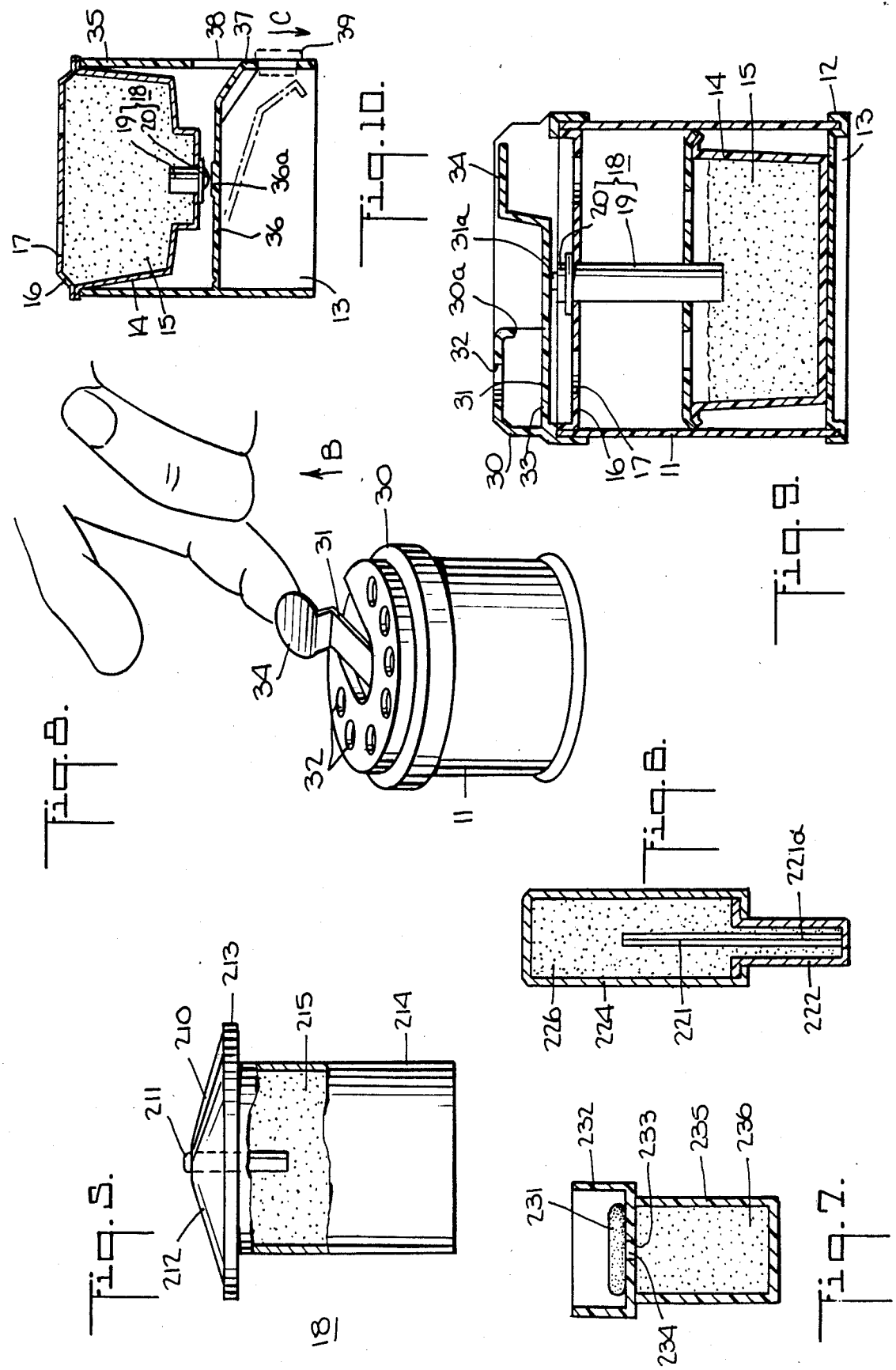

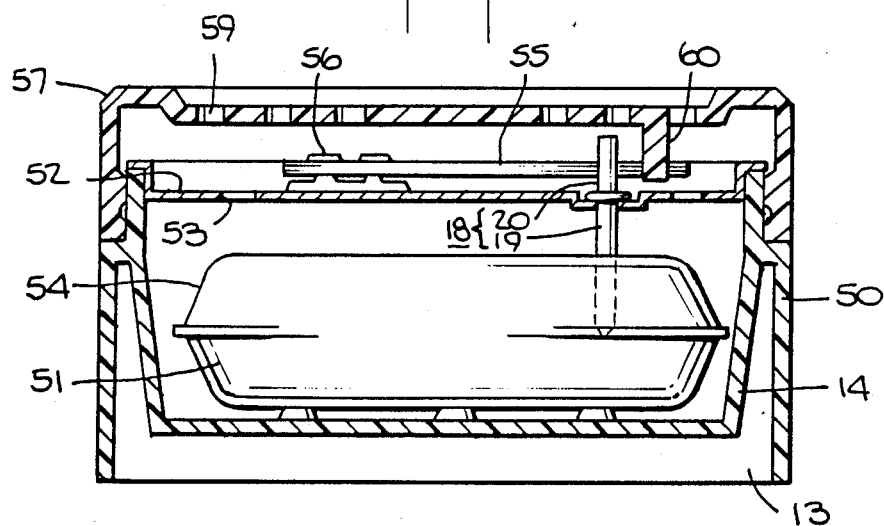
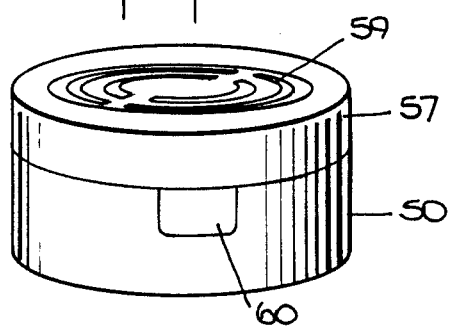
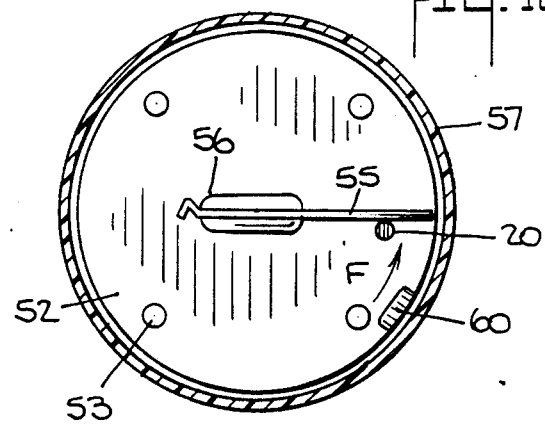
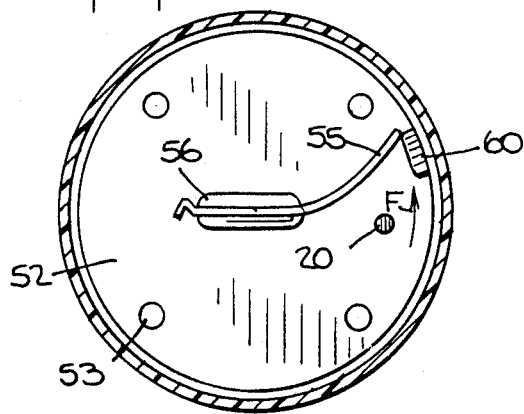
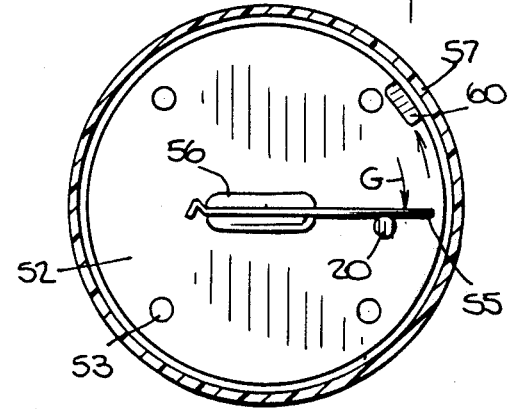

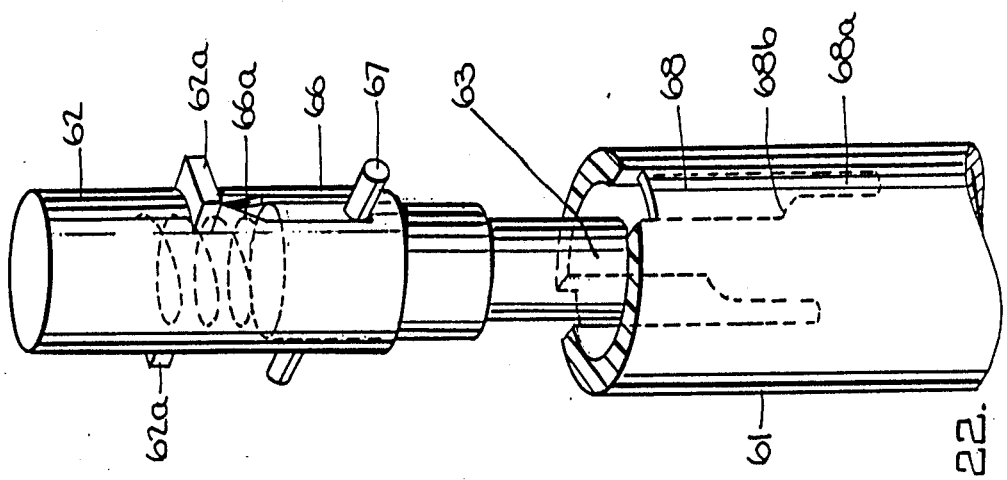
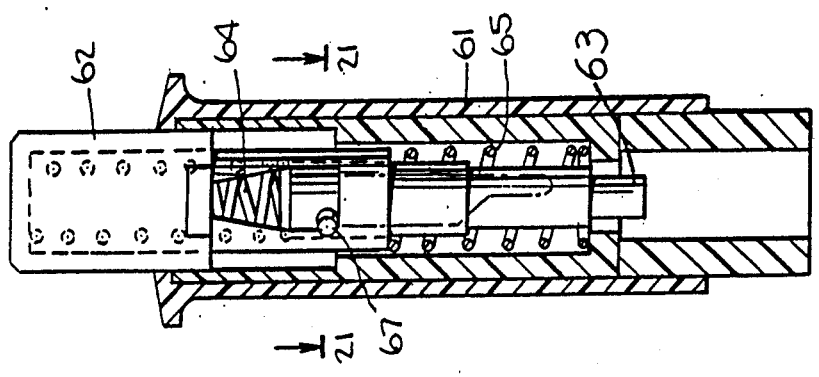
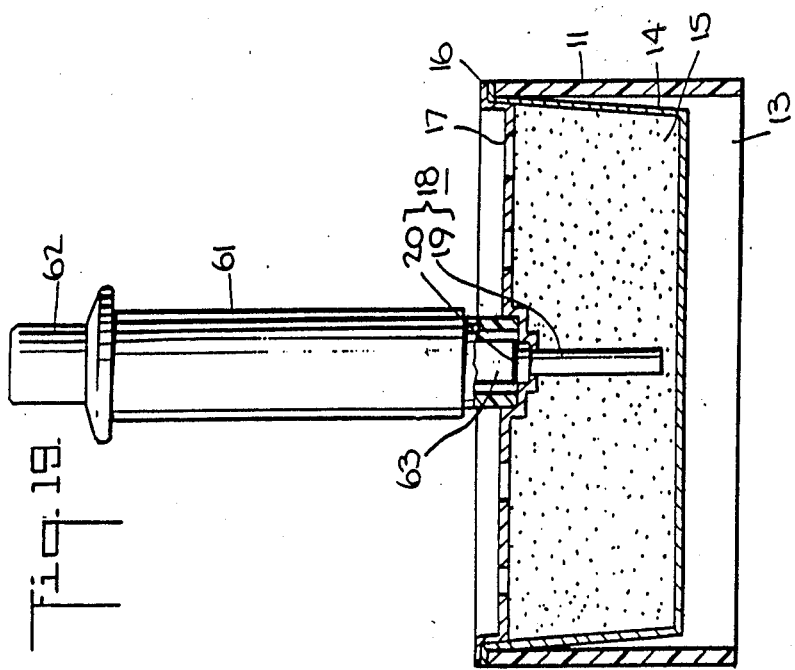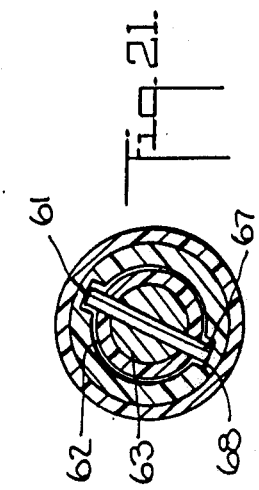

MOTION ACTIVATED THERMAL FOGGER

BACKGROUND

1. Field of the Invention

The present invention pertains generally to a system for igniting a combustible material by the relative motion of two members, and particularly to the utilization of such a system in a fumigator to burn a combustible mixture containing an active ingredient such as an insecticide or the like, to release the active ingredient.

2. Description of the Related Art

Devices for burning a combustible mixture containing an insecticide to exterminate insects, vermin or the like are well known. Such devices are commonly referred to as "thermal foggers" or "bombs". Typically, the insecticide in such a device is contained in a nonvolatile bag. The bag is placed within a heat-resistant container having a series of vents or lowers allowing the insecticide fumes to escape. The device is conventionally activated by igniting a fuse leading into the insecticide bag with a match or other source of intense heat.

Such devices have significant drawbacks from the viewpoint of safety and ease of use. For example, the device must be manipulated properly to orient the insecticide bag, the fuse, and the louvers. Also, the use of a match or other inflammable device is inconvenient and poses a safety hazard, especially since the insecticide is combustible as well as toxic.

SUMMARY OF THE INVENTION

We have conceived and contribute by the present invention a self-contained system having both an ignitor and combustible material which is activated by relative motion of two members. In the preferred form, the system comprises a fumigator, the combustible material being a slow burning mixture containing an insecticide.

In one aspect of the invention, an ignitor of the percussion type, for example, is mounted within a housing in communication with the combustible material. An actuator which may be a separate device or mounted within the housing is displaced by relative motion and subsequently springs back against the ignitor. The impact actuates the ignitor and thereby ignites the combustible material.

One of the advantages of the devices of the present invention is that, if the device fails to actuate the first time, the activation cycle can be repeated to insure activation of the device.

Although we have conceived the invention specifically for use with insecticides, it will naturally be appreciated that the invention is equally utilizable with any number of combustible materials, for example incense or slow burning mixtures primarily providing warmth, for example, to warm the extremities in the winter.

Certain aspects of our invention have been outlined rather broadly so that the detailed description which follows may be more readily and better understood. There are, of course, additional features of the invention that will be described and which will form the subject of the claims appended hereto. Those skilled in the art will appreciate that the principle upon which this disclosure is based may readily be utilized as a basis for designing other structures for carrying out the several purposes of the invention. It is important, therefore, that the claims be regarded as including such equivalent constructions as do not depart from the spirit and the scope of the invention.

DESCRIPTION OF THE DRAWINGS

Specific embodiments of the invention have been chosen for the purpose of illustration and description, and are shown in the accompanying drawings, which form a part of this specification.

FIG. 1 is a partially exploded perspective view of a first embodiment of the invention.

FIG. 2 is an elevational view of the first embodiment, while FIGS. 3 and 4 are cross-sectional views of the first embodiment during different phases of operation.

FIG. 5 is a transverse view, partially cut away, of a percussion-type ignitor.

FIG. 6 is a cross-sectional view of another percussion-type ignitor.

FIG. 7 is a cross-sectional view of another percussion-type ignitor.

FIG. 8 is a perspective view of a second embodiment of the invention in operation.

FIG. 9 is a cross-sectional view of the second embodiment.

FIG. 10 is cross-sectional view of a third embodiment of the invention.

FIGS. 14 through 18 are views of a fifth embodiment of the invention, wherein FIG. 14 is a perspective view, FIG. 15 is a cross-sectional view and FIGS. 16 through 18 are diagrammatic views during different phases of operation.

FIGS. 19 through 22 are views of an actuator of the present invention, wherein FIG. 19 is a view of the actuator in place in the device to be actuated FIGS. 20 and 21 are cross-sectional views of the actuator, and FIG. 22 is an exploded view showing constructional details.

DESCRIPTION OF THE PREFERRED EMBODIMENTS

Figure 11:
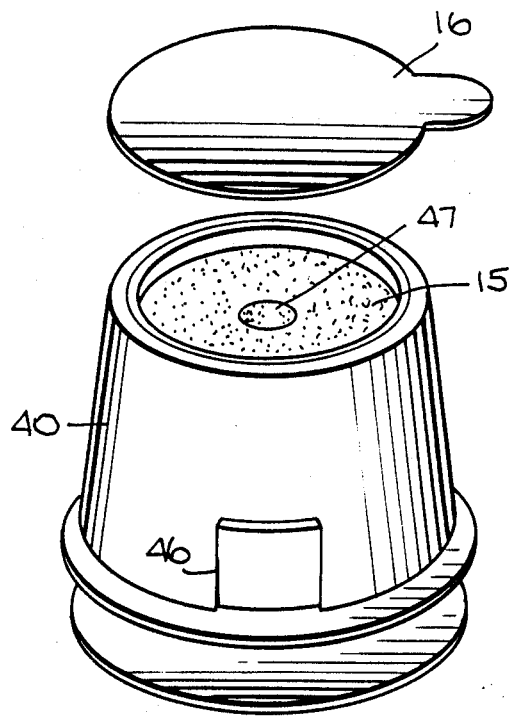
FIG. 11 is a perspective view of a fourth embodiment of the invention.

Referring now to FIG. 1, a fumigator 10 in the form of a single container is shown. As seen in cross-section in FIG. 3, the fumigator is formed of a composite can 11 made of a heat-resistant material having a lower lid 12 which forms a space 13 at the base thereof. The space provides insulation during the operation of the fumigator to protect the user and prevent damage to the surface upon which the fumigator is placed.

Cup 14 is disposed within can 11. The cup contains a powdered insecticide mixture 15 which slowly burns without a flame and releases insecticide fumes once ignited by ignitor 18.

In a preferred form, ignitor 18 consists of percussion cap 20 and delay fuse 19. Depending on the materials chosen for the percussion cap, it may be necessary to include immediately under and in contact with the percussion cap an ignitable material which produces extreme heat. The additional material may be necessary to ignite either the fuse material or the insecticide powder itself. Since the amount of ignitable material is small, it is not shown in most of the drawings. Further it is to be understood that the term "percussion cap" as used in this application, and in the attached claims, may mean either a percussion cap alone that produces enough heat to ignite the fuse or insectiside material or a percussion cap combined with an additional ignitable material that can produce sufficient heat to ignite the fuse or insecticide material. The percussion cap is responsive to an impact force and ignites delay fuse 19. Although its inclusion is optional, use of the delay fuse is desirable since it permits the operator to withdraw from the fumigator before production of noxious fumes commences. If the delay fuse is omitted, percussion cap 20 would be placed directly in contact with mixture 15.

Ignitor 18 is mounted at the center of lid 16. Lid 16 is set at the top of can 11 and has a series of vents 17 formed in the peripheral region of the lid. The vents provide an unobstructed passage permitting insecticide fumes to escape.

Cam structure 21 is press-fit over lid 16 on the upper surface of can 11 and held stationary to prevent cam structure 21 from rotating. The cam structure has a series of ramps 22 at the periphery thereof. These cams act to lift leaf spring 26 as will be described below.

Cap 24 is mounted for rotational movement onto cam structure 21. The cap has a series of Vents 25 formed in its interior acting in conjunction with vents 17 in lid 16 to permit noxious fumes to escape. As shown in FIG. 2, cap 24 has formed therein leaf spring 26. Alternatively, leaf spring 26 may be formed from a resilient metal spring mounted at side 28. The opposite end 29 of leaf spring 26 is free to move upwardly and downwardly. When assembled onto cam structure 21, a central contactor 26a of leaf spring 26 is adjacent to but not contact with ignitor 18.

In operation, cap 24 is rotated in the direction of arrow A (counterclockwise when viewed from the top). As seen in FIG. 4, as cap 24 is rotated, the free end 29 of leaf spring 26 engages with cam 22, which causes the spring to rise. As the leaf spring reaches edge 27 of cam 22, the leaf spring is released, and through spring action snaps back against percussion cap 20. The force of contactor 26a impacting against the percussion cap ignites percussion cap 20 which in turn ignites delay fuse 19. After a predetermined interval which allows the user to leave the area, the delay fuse ignites the insectcide 15.

It should be noted that edge 27 of cam 22 prevents cap 24 from being turned in the incorrect direction. Moreover, frangible lock 24a may be provided in cap 24 to prevent premature operation of the device.

In certain applications, it may be desired to produce cup 14, insecticide 15, lid 16, and ignitor 18 as a single replaceable unit. Once insecticide 15 has been completely burned, this unit may be replaced with a new charge, and operation of the device repeated. Alternatively, cup 14 may be integrally molded with can 11.

FIGS. 5, 6 and 7 illustrate percussion-type ignitors usable to ignite the insecticide. In the embodiment shown in FIG. 5, upper cone 210 narrows to meet bulb 211. Cone 210 is formed of a rigid material, for example brass, while bulb 211 is considerably more flexible, for example very thin malleable brass. Bulb 211 is filled with an impact-sensitive material. We have found that a lead styphanate powder, being readily available, is an excellent choice for this material. Cone 211 may be filled with a material 212 which produces extreme heat yet is easily ignitable. If the material selected to fill bulb 211 does not product sufficient heat to ignite the delay fuse or the insecticide material, approximately 1.5 grains of AlA ignition compound, which will produce extreme heat, is well suited for use as material 212. AlA ignition compound is a product of pyrotechnic Specialties, Inc., Byron, Ga. This material contains 65% Zirconium, 25% red $FeO_3$, and 10% $SiO_2$. If either the fuse material is ignited at a lower temperature or a percussion-type ignitor is used which produces a higher temperature, then material 212 is optional.

The base of cone 210 is provided with flange 213 for mounting the igniter as desired. Cylindrical housing 214 is fixed to the flange. The housing is hollow and contains a slow burning material 215 which constitutes a delay fuse and which is ignited by the action of material 212. We have found that a mixture of nickel and zirconium is a good choice for material 215, although other equivalent materials well known in the art may be used as delay fuse materials. One prefered material comprises: 14% $KClO_4$, 23% Zr/Ni blend (70/30 weight ratio), 3% Zr/Ni blend (30/70 weight ratio) and 60% $BaCrO_4$. Of course, material 215 may be press-molded into a shape similar to housing 214, and may obviate the need to provide housing 214 altogether.

In operation, an impact force striking bulb 211 deforms the bulb and causes the filler material to ignite. If lead styphanate is used, the user hears a popping noise which signals the user that the material has been activated. The material in turn ignites material 212 which burns with high intensity and, in turn, ignites material 215. Material 215 burns slowly to provide a delay interval allowing the user to leave the area before material 215 ignites the insecticide.

In the embodiment shown in FIG. 6, numeral 221 refers to a rod, the lower end 221a thereof being coated with a contact sensitive material, for example mercury fulminate. End 221a is encapsulated in sheath 222 to prevent premature activation of the ignitor.

Rod 221 projects upwardly into compartment 224 which contains a slow burning material 226, for example, a mixture of nickel and zirconium.

In operation, when sheath 222 is struck, the coating on rod 221 ignites. This in turn ignites material 226. As previously described, material 226 provides a delay interval allowing the user to leave the area before material 226 ignites the insecticide.

FIG. 7 shows a still further embodiment of a percussion-type ignitor. In this embodiment, a pouch 231 of lead styphanate powder or similar impact ignitable material is placed in open enclosure 232. This enclosure has an opening 233 in the bottom to allow communication between the interior of enclosure 232 and the interior of compartment 235. If necessary opening 233 may be filled with a material 234 which can produce a temperature high enough to ignite fuse material 236 contained within compartment 235. When pouch 231 is struck, it ignites material 234 which in turn ignites fuse material 236 to provide a delay interval allowing the user to leave the area before fuse material 236 ignites the insecticide. Compartment 235 may be made from a heat conductive material to transfer the heat from fuse material 236 to insecticide mixture 15. Alternatively, compartment 235 can have an opening (not shown) in the base opposite opening 233 to allow communication between fuse material 236 and insecticide mixture 15.

FIG. 8 and 9 show a second embodiment of the invention which may utilize either of these ignitors, particularly that shown in FIG. 7. Since the embodiment in FIGS. 8 and 9 is somewhat similar to the first embodiment, elements with similar functions to that of the first embodiment have received the same reference numerals, and detailed discussion of these elements is omitted.

In FIG. 8, cap 30 is mounted directly to can 11 over lid 16. Cap 30 has a series of vents 32 formed in the periphery thereof. An integrally molded spring 31 extends laterally across the center of cap 30. Alternatively, a resilient metallic spring may be utilized and mounted at end 33 to cap 30. The free end of spring 31 has handle 34 formed therein. When assembled, a contactor 31a of spring 31 is adjacent to but not in contact with ignitor 18.

To operate the device, handle 34 is lifted in the direction of arroW B until spring 31 contacts stop 30a, which prevents defomation of spring 31. When released, spring 31 snaps back and contactor 31a is forced against percussion cap 20. The force of this impact ignites the percussion cap and in turn, delay fuse 19. After a predetermined period which allows the user to leave the area, the delay fuse ignites the insecticide.

If desired, a frangible lock (not shown) may be provided to prevent unintentional and premature operation of the device. Also, as in the device in the first embodiment, cup 14, insecticide 15, lid 16 and ignitor 18 may be provided as a single, replaceable unit permitting repeated operations of the device, or cup 14 and can 11 may be integrally molded for single-use applications.

FIG. 10 shows another embodiment of the invention, somewhat similar to the first and second embodiments. In FIG. 10, elements whose function is similar to that of the previously described embodiments have received the same reference numeral, and detailed description thereof has been omitted.

In FIG. 10, ignitor 18 is mounted at the bottom of container 14. Thus, insecticide 15 is ignited from the bottom.

Cup 14 is mounted in the center of housing 35. Leaf spring 36 is molded from one edge of housing 35 and extends through opening 38 in the housing. Alternatively, a resilient metallic spring may be mounted at end 39 to housing 35. The free end of the leaf spring has handle 37 formed therein. When assembled, contactor 36a of the spring is adjacent to but not in contact with ignitor 18.

To operate the device handle 37 is depressed in the direction of arrow C to a position indicated by the broken lines. When released, the leaf spring springs back and contactor 36a strikes ignitor 18. The impact actuates the ignitor which in turn, ignites the delay fuse 19. After a predetermined interval allowing a user to leave the area, the delay fuse ignites insecticide 15.

As before, cup 14, insecticide 15, lid 16 and ignitor 18 may be formed into a single replaceable unit, or cup 14 and housing 35 may be integrally molded for single-use applications. Additionally while a percussion ignitor has been illustrated, other forms of ignitor are equally applicable. Finally, frangible lock 39 may be provided to prevent premature and unintentional operation of the device.

Figure 13:
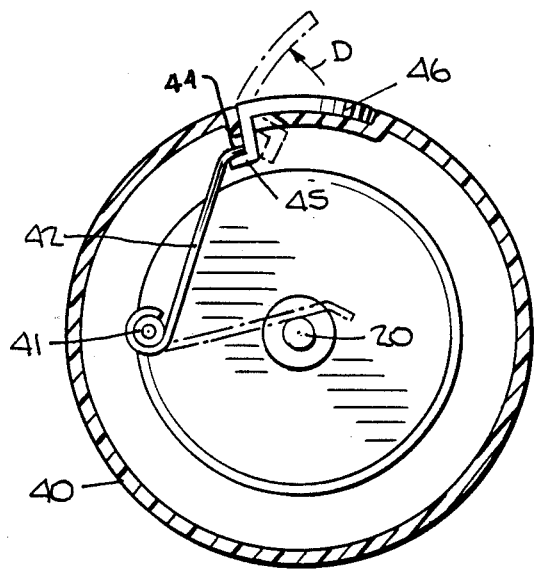
FIGS. 12 and 13 are side and top cross-sectional views, respectively, of the fourth embodiment of the invention.
Figure 12:
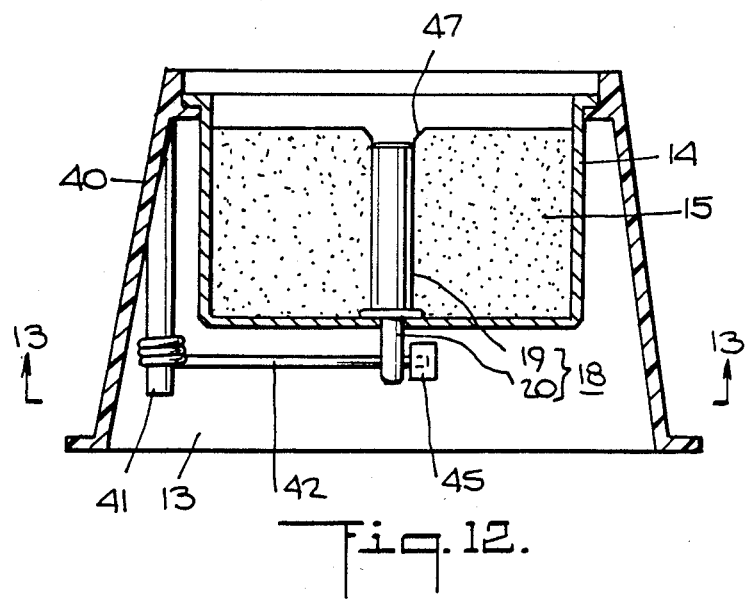

FIGS. 11 through 13 show another embodiment of the invention somewhat similar to the previous embodiments. In these figures, elements with similar functions to that in the first embodiment have received the same reference numerals and the description thereof is omitted.

As shown in FIGS. 11 and 12 ignitor 18 is mounted at the bottom of inner cup 14, as in the third embodiment. Inner cup 14 is disposed within housing 40. Housing 40 has post 41 formed therein to support torsional spring 42. Bend 44 is formed in the free end of leaf spring 42 to engage with pawl 45 of handle 46. Handle 46 is mounted for rotational movement at the circumference of housing 40. The engagement of bend 44 with pawl 45 effectively provides a preload for spring 42.

To operate the device, a user rotates handle 46 in the direction of arrow D as shown in FIG. 13. This motion releases spring 42 which springs in the direction of arrow E and strikes ignitor 18. The impact actuates percussion cap 20 of ignitor 18 which in turn ignites the delay fuse 19. After a predetermined interval which allows a user to leave the area, the delay fuse ignites the insecticide 15. In this embodiment the insecticide is shown as a solid material with a central hole 47 which accepts the ignitor. In this case, the insecticide burns from the central hole toward the edge of the solid.

Although the invention has been described with specific percussion ignitors, other types of ignitor are equally applicable. Also torsional spring 42 may be integrally molded with housing 40. Finally, as in the other embodiments, inner cup 14, insecticide 15, lid 16 and ignitor 18 may be formed into a single, replaceable unit, or cup 14 and housing 40 may be integrally molded for single-use applications.

FIGS. 14 through 18 show another embodiment of the invention somewhat similar to the previous embodiments. In these figures elements performing a function similar to that in the previous embodiments have received the same reference numerals and detailed discussion thereof has been omitted.

In FIGS. 14 and 15 cup 14 and housing 50 have been integrally molded, although as before, cup 14 may be formed separately so as to be removable. Insecticide 51 is contained within pouch 54 at the bottom of cup 14. Lid 52 having a series of vents 53 covers cup 14. Optionally insecticide 51 can be contained loose within cup 14. Ignitor 18 is mounted at one side of lid 52 and extends downwardly through the pouch into contact with the insecticide. A support bracket 56 is formed diametrically opposed to ignitor 18. Support 56 supports leaf spring 55 which is positioned adjacent to but not in contact with ignitor 18.

Cover 57 is mounted for rotational movement on housing 50. The cover has a series of holes 59 cooperating with holes 53 to allow insecticide fumes to escape. On the underside of cover 57, cam arm 60 is formed at a position where it can engage the free end of leaf spring 55. It is prefered that cam arm 60 be mounted eccentrically to leaf spring 55.

Operation of the device will be illustrated in connection with FIGS. 16 through 18. As shown in FIG. 16, cover 57 is rotated in the direction of arrow F. As cam arm 60 contacts leaf spring 55, continued rotation of cover 57 draws leaf spring 55 also in the direction of arrow F, as shown in FIG. 17. FIG. 18 shows the device when the cover has rotated to a point sufficient to release the leaf spring. At this point, the leaf spring springs back in the direction of arrow G and strikes ignitor 18. This impact actuates percussion cap 20 which, in turn, ignites delay fuel 19. After a predetermined interval which allows the user to leave the area, the delay fuse ignites the insecticide.

Although not illustrated, a ratchet mechanism may be incorporated in this embodiment to prevent rotation of cover 57 in the incorrect direction. Additionally, frangible lock 60 may be provided to prevent premature and unintentional operation of the device. Also, while a percussion type ignitor has been described, other types of ignitors are equally applicable and can be used. Also ignitor means with or without a delay fuse or delay mechanism can also be used..

FIGS. 19 through 22 show another embodiment of the invention in which the actuator for the ignitor 18 has been conceived as a separate unit. Of course, this principle is equally applicable to embodiments heretofore described. In FIG. 19, elements having a similar function to that of the previous embodiments have been numbered with the same reference numerals, and detailed description thereof has been omitted.

In FIG. 20, hollow button 62 is disposed in the center of cylindrical housing 61, and plunger 63 is contained within the hollow of the button, plunger 63 is urged downwardly by the action of inner spring 64, while outer spring 65 biases button 62 upwardly. FIG. 21 depicts the concentric arrangement of the housing, the button, and the plunger.

As seen in FIG. 22, button 62 has a pair of cam openings 66 at opposite surfaces thereof. The cam openings support pin 67 which fixes plunger 63 within the button against the action of the inner spring 64. The cam openings are significantly wider than the diameter of pin 67, and each has an incline 66a toward the top of the opening. The inclines interact with pin 67 to twist the plunger in a manner to be described below.

As also seen in FIG. 22, housing 61 has a pair of tracks 68, each of which terminates in narrow portion 68a and ledge 68b. The width of the main portion is approximately the same as the width of the cam openings, and accommodates rotational motion of pin 67 within the cam openings. Additionally, the tracks accommodate lugs 62a formed on button 62 to prevent rotation of the button within the housing.

To operate, the actuator is placed adjacent the object device as shown in FIG. 19. The object device includes an exposed ignitor 18. As button 62 is depressed, lugs 62a and pin 67 descend in tracks 68 until pin 67 contacts ledge 68b which temporarily stops further downward travel of the plunger. Continued depression of the button compresses inner spring 64 to preload the plunger until pin 67 is adjacent inclines 66a. Further depression of the button causes the inclines to interact with the pin to rotate the plunger and the pin. When the pin is rotated into alignment with narrow portions 68a, the inner spring is released, driving the plunger forceably downward to strike ignitor 18 as shown by arrow H. The extent of narrow portion 68a limits the travel of the plunger. As previously described the impact of the plunger against the ignitor 18 ignites percussion cap 20 which, in turn, ignites delay fuse 19. After a predetermined interval, the delay fuse ignites insecticide 15.

Once ignition of the insecticide has been detected, the actuator is withdrawn from the object device. Outer spring 65, which was compressed during operation of the actuator, allows button 62, and consequently the plunger, to return to their starting positions when released.

If desired, the relative orientation of the structure shown in FIG. 19 may be inverted, and the actuator may be molded into a base structure for supporting the combination of cup 14, insecticide 15, lid 16 and ignitor 18. Thus, a reuseable actuator/base assembly may be repeatedly utilized with replaceable insecticide units.

While preferred embodiments of our invention, and indeed the best embodiments known to us, have been described in detail, it should be understood that the invention should not be limited to any specific structure described above. Rather, the scope of the invention should be ascertained by reference to the following claims.

What we claim is:

1. A motion activated thermal fogger apparatus comprising:
   a combustible material;
   a base portion containing therein a compartment for containing said combustible material and having at least one opening in the upper surface thereof for allowing the escape of fumes emitted after the combustible material has been ignited;
   a percussion ignitor for igniting the combustible material in response to forceable impact, said ignitor being mounted within said housing and disposed so as to communicate with the combustible material; and
   detachably attached to said base portion, actuator means for actuating said ignitor such actuator means further comprising top housing having at least one opening therein for allowing the escape of fumes, a spring portion which has a spring, fixed at one end and having a contact portion thereupon and a loading portion, said loading portion having at least one camming ramp therein, said top housing being rotatable relative to said loading portion so that said spring is forced along and up said camming ramp by said rotation, loading said spring relative to the base portion, so that, when sufficient rotational force has been applied, said spring falls from the end of the camming ramp with sufficient impact to ignite said percussion ignitor within said base portion.

2. An apparatus according to claim 1, wherein said combustible material contains an active ingredient which is released by the ignition of combustible material.

3. An apparatus according to claim 2 wherein said active ingredient is an insecticide.

4. A motion activated thermal fogger apparatus comprising:
   a combustible material;
   a housing having at least one opening therein for the escape of fumes emitted after ignition of the combustible material, and an compartment for containing the combustible material;
   an ignitor for igniting the combustible material, said ignitor being mounted within said housing and disposed so as to communicate with the combustible material; and
   actuator means for actuating said ignitor, said actuator means being mounted on said housing adjacent said ignitor, said actuator means responding to external stimulus with sufficient spring action to strike said ignitor thereby igniting the combustible material, wherein said actuator means is detachable from the housing and the ignitor and includes a plunger, a pair of springs mounted in opposed relationship, and an activation member mounted for translational motion within said actuator means and acting on said plunger and said springs to actuate said ignitor.

5. An apparatus according to claim 4, wherein said actuator further includes a member usable as a base for said apparatus.

6. A motion activated thermal fogger apparatus comprising:
   a combustible material;

a housing having at least one opening therein for the escape of fumes emitted after ignition of the combustible material, and a compartment for containing the combustible material, said housing including means for insulating said compartment for an exterior portion of said housing;

a percussion ignitor for igniting the combustible material in response to forceable impact, said ignitor being mounted within said housing and disposed so as to communicate with the combustible material; and resilient actuator means for actuating said ignitor, said actuator means including a spring and having a contact portion and a manipulation portion and being mounted on said housing so that said contact portion is adjacent said ignitor, said actuator means responding to external stimulus acting on said anipulation portion with sufficient spring action to cause said contact portion to strike said ignitor thereby igniting the combustible material, wherein said actuator means is detachable from the housing and the ignitor and includes a plunger, said plunger having said contact means on one end thereof, a pair of springs mounted in opposed relationship, and an activation member mounted for translational motion within said actuator means and acting on said plunger and said springs to actuate said ignitor.

7. An apparatus according to claim 6, wherein said actuator further includes a member usable as a base for said apparatus.

* * * * *